United States Patent
Liou et al.

(10) Patent No.: US 10,272,651 B1
(45) Date of Patent: Apr. 30, 2019

(54) FIBER COMPOSITE AND MANUFACTURING METHOD THEREOF

(71) Applicant: INDUSTRIAL TECHNOLOGY RESEARCH INSTITUTE, Hsinchu (TW)

(72) Inventors: Shir-Joe Liou, Hsinchu (TW); Jih-Hsiang Yeh, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 16/129,931

(22) Filed: Sep. 13, 2018

Related U.S. Application Data

(60) Provisional application No. 62/573,721, filed on Oct. 18, 2017.

(30) Foreign Application Priority Data

Dec. 27, 2017 (TW) .............................. 106145989 A

(51) Int. Cl.
*B32B 27/08* (2006.01)
*B32B 37/12* (2006.01)
(Continued)

(52) U.S. Cl.
CPC .............. *B32B 27/08* (2013.01); *B32B 27/12* (2013.01); *B32B 27/20* (2013.01); *B32B 27/306* (2013.01);
(Continued)

(58) Field of Classification Search
CPC ......... B32B 27/08; B32B 37/12; B32B 37/14; B32B 27/38; B32B 27/20; B32B 27/306; B32B 27/34; B32B 27/12
See application file for complete search history.

(56) References Cited

U.S. PATENT DOCUMENTS 5,671,142 A    9/1997  Tatarazako
9,308,705 B2   4/2016  Liou et al.
(Continued)

FOREIGN PATENT DOCUMENTS

CA    2774403    5/2011
CA    2778607    5/2011
(Continued)

OTHER PUBLICATIONS

Fereidoon, et al. "Damping Augmentation of Epoxy Using Carbon Nanotubes", International Journal of Polymeric Materials, 2011, 11-26.
(Continued)

*Primary Examiner* — Michael C Miggins
(74) *Attorney, Agent, or Firm* — Amin, Turocy & Watson LLP

(57) ABSTRACT

A fiber composite and manufacturing method thereof are provided. The fiber composite material includes: a plurality of fiber prepreg layers each including a first resin and fibers impregnated with the first resin; and at least one composite resin layer disposed between two of the fiber prepreg layers and including multi-layered carbon nanotubes and a second resin, wherein the surface of the multi-layered carbon nanotube has reactive functional groups containing an amine group, a carboxyl group, a hydroxyl group or an acyl chloride group, wherein the at least one composite resin layer and the fiber prepreg layers together form a hollow tube and the layer ratio of the at least one composite resin film layer to the fiber prepreg layers is 1:4 to 1:7.

18 Claims, 2 Drawing Sheets

(51) Int. Cl.
*B32B 37/14* (2006.01)
*B32B 27/38* (2006.01)
*B32B 27/20* (2006.01)
*B32B 27/30* (2006.01)
*B32B 27/34* (2006.01)
*B32B 27/12* (2006.01)

(52) U.S. Cl.
CPC .............. *B32B 27/34* (2013.01); *B32B 27/38* (2013.01); *B32B 37/12* (2013.01); *B32B 37/14* (2013.01)

(56) References Cited

U.S. PATENT DOCUMENTS

| | | |
|---|---|---|
| 2006/0267235 A1 | 11/2006 | Ma et al. |
| 2010/0143661 A1 | 6/2010 | Warrick |
| 2010/0173099 A1 | 7/2010 | Saito et al. |
| 2011/0285049 A1 | 11/2011 | Baker et al. |
| 2013/0057008 A1 | 3/2013 | Takemura et al. |
| 2016/0130952 A1 | 5/2016 | Voleti et al. |
| 2016/0176176 A1 | 6/2016 | Liou et al. |

FOREIGN PATENT DOCUMENTS

| | | |
|---|---|---|
| CN | 1369925 | 9/2002 |
| CN | 101250770 | 8/2008 |
| CN | 101772553 | 7/2010 |
| CN | 103847206 | 6/2014 |
| CN | 104527173 | 4/2015 |
| CN | 104558659 | 4/2015 |
| DE | 102010022469 | 12/2011 |
| JP | 58-053769 | 3/1983 |
| JP | 60-237896 | 11/1985 |
| JP | 2007-095471 | 4/2007 |
| JP | 2008-081695 | 4/2008 |
| JP | 2009-013327 | 1/2009 |
| JP | 2010-147526 | 7/2010 |
| JP | 2011-162898 | 8/2011 |
| TW | 200946302 | 11/2009 |
| TW | 201018084 | 5/2010 |
| TW | 201033012 | 9/2010 |
| TW | 201231286 | 8/2012 |
| TW | I509119 | 11/2015 |
| TW | M526495 | 8/2016 |
| TW | 201722708 | 7/2017 |

OTHER PUBLICATIONS

Zhou, et al. "Interfacial damping characteristics of carbon nanotube-based composites", Composites Science and Technology, vol. 64, Issue 15, Nov. 2004, pp. 2425-2437.

Suhr, et al. "Viscoelasticity in carbon nanotube composites", Nature Materials vol. 4, pp. 134-137 (2005).

Ghavanloo, et al. "Vibration and instability analysis of carbon nanotubes conveying fluid and resting on a linear viscoelastic Winkler foundation", Physica E42(2010)2218-2224.

Gou, et al. "Development and characterization of carbon nanopaper-based", Proc. of SPIE vol. 6170 61701O-1.

Kim, et al. "Edge-functionalized graphene-like platelets as a co-curing agent and a nanoscale additive to epoxy resin", J. Mater. Chem., 2011, 21, 7337.

Taiwanese Decision to Grant a Patent for Taiwanese Patent Application No. 106145989 dated Feb. 15, 2019.

Taiwanese Decision to Grant a Patent for Taiwanese Patent Application No. 107129125 dated Feb. 15, 2019.

FIBER COMPOSITE AND MANUFACTURING METHOD THEREOF

CROSS REFERENCE TO RELATED APPLICATIONS

This application claims the priority benefit of Taiwan Application Serial No. 106145989, filed on Dec. 27, 2017, and U.S. Provisional Application No. 62/573,721, filed on Oct. 18, 2017. The entirety of the above-mentioned patent applications is hereby incorporated by reference herein.

TECHNICAL FIELD

The present disclosure relates to a fiber composite material with vibration damping characteristic and a manufacturing method thereof.

BACKGROUND

It is an essential development trend nowadays to use high molecular fiber composite material combined with other products of various functionality and uses in view of today's demand for properties such as light weighted, high strength and high flexibility in design to develop products of various use. Due to the demand for low-profile and light weighted products, design generally focuses on high strength. However, high physical strength often comes with the disadvantage of increased brittleness, causing the material to break when subject to a force. In order to solve this problem, it is necessary to increase the damping characteristic to increase the vibration damping effect when subject to a force.

When a transport used robotic arm moves at a high speed (2.8 m/s), or rotates (210°/s), it will cause displacement, deformation and vibration. And when the time it took for the vibration of the high molecular fiber composite material fabricated robotic arm to stop is too long, it is required to wait for longer time for the swing to stop or the vibration to reduce to an acceptable degree for the next movement. As a result, this will affect the productivity. Therefore, it is required to reduce the decay time of the vibration to ensure good productivity.

Several references have indicated that a fiber composite material has the effect of vibration damping; however, the extent of vibration damping is still insufficient. Thus, there is a need to increase the vibration damping as well as maintaining the material hardness.

SUMMARY

The present disclosure provides a fiber composite material, including: a plurality of fiber prepreg layers each including a first resin and fibers impregnated with the first resin; and at least one composite resin layer disposed between two of the fiber prepreg layers to form a hollow tube with the plurality of fiber prepreg layers, wherein the at least one composite resin layer includes multi-layered carbon nanotubes and a second resin, and each of the multi-layered carbon nanotubes has reactive functional groups containing an amine group, a carboxyl group, a hydroxyl group or an acyl chloride group on its surface, and wherein the layer ratio of the at least one composite resin layer to the fiber prepreg layers is 1:4 to 1:7.

The present disclosure further provides a manufacturing method for the fiber composite material, including: placing at least one composite resin layer on a fiber prepreg layer which includes a first resin and fibers impregnated with the first resin, wherein the at least one composite resin layer includes multi-layered carbon nanotubes and a second resin and each of the multi-layered carbon nanotubes has reactive functional groups containing an amine group, a carboxyl group, a hydroxyl group or an acyl chloride group; wrapping the fiber prepreg layers and the at least one composite resin layer to form a hollow tube, with the layer ratio of the at least one composite resin layer to the fiber prepreg layers between the outer wall and the inner wall of the hollow tube to be 1:4 to 1:7; and molding the hollow tube.

DETAILED DESCRIPTION

Figure 1:
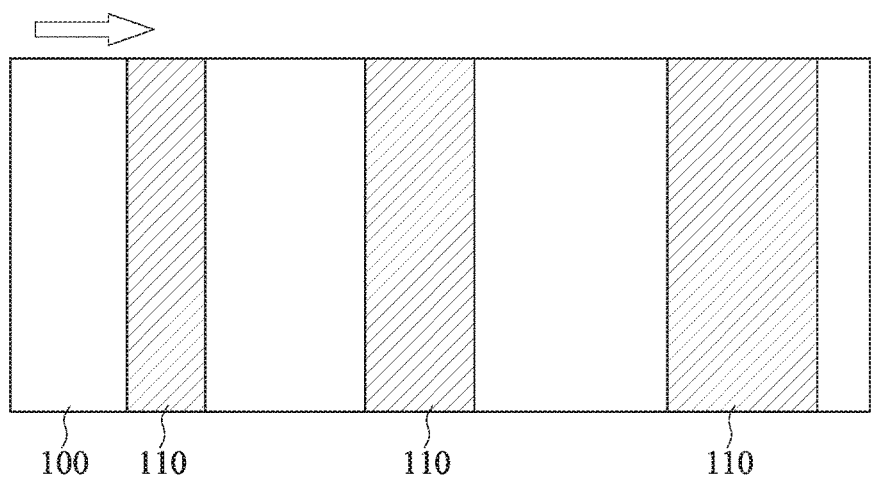
FIG. 1 is a schematic view of the manufacturing method of a fiber composite material in accordance with the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. In the fiber composite material of the present disclosure, it is discovered that the layer ratio of the at least one composite resin layer to the fiber prepreg layers between the outer wall and the inner wall of the hollow tube at 1:4 to 1:7 can greatly increase the vibration damping effect while maintaining the material hardness.

The present disclosure further discloses a manufacturing method for the fiber composite material, including: placing at least one composite resin layer on a fiber prepreg layer which includes a first resin and fibers impregnated with the first resin, wherein the at least one composite resin layer include multi-layered carbon nanotubes and a second resin and each of the multi-layered carbon nanotubes has reactive functional groups containing an amine group, a carboxyl group, a hydroxyl group or an acyl chloride group; wrapping the fiber prepreg layer and the at least one composite resin layer to form a hollow tube, such that the layer ratio of the at least one composite resin layer to the fiber prepreg layer between the outer wall and the inner wall of the hollow tube is 1:4 to 1:7; and molding the hollow tube.

In general, the manufacturing method of the fiber prepreg layers comprises hand lay-up layer method, spraying, lamination, continuous lamination, resin transfer molding, filament winding, sheet molding compound (SMC), bulk molding compound (BMC), prepreg molding, autoclaving, etc.

In an embodiment, the fiber can be selected from at least one of the followings: carbon fiber, glass fiber, aromatic polyamide fiber (such as Kevlar), boron fiber, nylon fiber, polyethylene terephthalate fiber (such as Tetoron), cotton fiber, wool fiber, steel fiber, aluminum fiber or ceramic whisker fiber. In the present disclosure, the fibers of the fiber prepreg layers are impregnated with the first resin and the composite resin layer is formed by mixing multi-layered carbon nanotubes with second resin, wherein the first resin and the second resin can be the same or different, which includes thermoplastic resin or thermosetting resin. Thermoplastic resins may include, e.g., polycarbonate (PC), nylon, polypropylene (PP), polyphenylene sulfide (PPS) orpolyetheretherketone (PEEK); and thermosetting resin may include, e.g., epoxy resin.

In an embodiment, the thickness of the fiber prepreg layer may range from 50 μm to 200 μm. The thickness of the composite resin layer may range from 5 μm to 200 μm. Said thickness can be adjusted according to the rigid strength requirements of the prepared components.

It is believed that when the force cause the resin result in a relative displacement (sliding) with respect to the wall of the carbon nanotube, the integration of the displacement difference and the shear force at the interface equals to the energy loss produced, which is the principal of vibration damping.

In an embodiment, multi-layered carbon nanotubes with multiple layered walls are utilized to provide more micro sliding compared to single layered carbon nanotubes, such that the accumulated damping characteristic can be amplified quickly, to provide more efficient vibration damping.

On the other hand, the surface of the carbon nanotube is modified to have reactive functional groups containing an amine group, a carboxyl group, a hydroxyl group or an acyl chloride group, but not limited thereto. Please refer to J. Mater. Chem., 2011, 21, 7337-7342 for the modification method.

In addition, in an embodiment, the surface area of the carbon nanotube is in a range from 100 to 300 $m^2/g$, and the carbon nanotubes with such range of surface area can be more mixed with the second resin, and 0.5-8 wt % carbon nanotubes are present in at least one composite resin layer while 92-99.5 wt % of second resin is present in the at least one composite resin layer.

According to the manufacturing method of the present disclosure, the fiber composite material is heated to be molded. During the heating process, the reactive functional groups of the carbon nanotubes bonded with the first resin and the second resin to cure.

In general, the manufacturing method for forming fiber composite material adopts traditional stacking method, i.e., superimposing layers of different materials until reaching certain numbers of layers, followed by wrapping and molding. However this method can only produce one fiber composite material at a time, and is therefore less economical for large industrial scale production.

Hence, in another embodiment, the manufacturing method of the fiber composite material of the present disclosure involves placing at least one composite resin layer on a fiber prepreg layer, and based on the practical needs, it is applicable to place a plurality of composite resin layers on the fiber prepreg layer, allowing the plurality of composite resin layers to be spaced apart, such that after the hollow tube is formed, the layer ratio of the at least one composite resin layer and the fiber prepreg layer is 1:4 to 1:7 between the outer wall to and the inner wall of the hollow tube. Specifically, when placing the plurality of composite resin layers, each of the composite resin layer is placed with a space from each other along the wrapping direction of the fiber prepreg layer such that it is possible to more economically produce fiber composite materials in large quantities by the machine, in accordance with the manufacturing method of the present disclosure.

Moreover, according to the manufacturing method of the present disclosure, the shape of the hollow tube includes, but not limited to, circular, elliptical, square, and rectangular shape.

The following embodiments are provided below to illustrate the details of the present disclosure, however it should be noted that the present disclosure should not be limited by the illustrations of the embodiments below.

First Embodiment

The manufacturing method and the condition of the first embodiment of the present disclosure (number: 4 L) are described as follows. Fiber: carbon fiber (Toray, T700SC, 12K); resin: epoxy resin (Dow Chemical, Epon 828); multi-layered carbon nanotubes (A-MWCNT1020, Scientech); modified functional group amine group (based on the method of J. Mater. Chem., 2011, 21, 7337-7342).

As shown in FIG. 1, a composite resin layer 110 (70 μm thickness, 5 wt % of multi-layered carbon nanotubes in the composite resin layer) is placed on the fiber prepreg layers 100 (100 μm thickness). The composite is formed by alternately placing the composite resin layer so that the composite resin layer and the fiber prepreg layer are in a layer ratio of 1:5. During molding, a core mold is prepared with a plastic air pocket, wrapping the composite structure in the direction indicated by the arrow, then placing the core mold that is covered by the composite structure into another aluminum molding equipment and leaving the plastic air bag in while removing the core mold, then pumping air (25-30 psi) into the space without the core mold to support the hollow tube to be formed. Meanwhile, applying a pressure of 20-25 psi at the side of the aluminum molding equipment and heated at 160° C. for 40 minutes. Afterwards, the fiber composite material can be taken out until the temperature drops to room temperature. The wrapped composite resin layer is positioned between layer 4 and layer 5 of the fiber prepreg layer, between layer 8 and layer 9 of the fiber prepreg layer, between layer 12 and layer 13 of the fiber prepreg layer and between layer 16 and layer 17 of the fiber prepreg layer.

Figure 2:
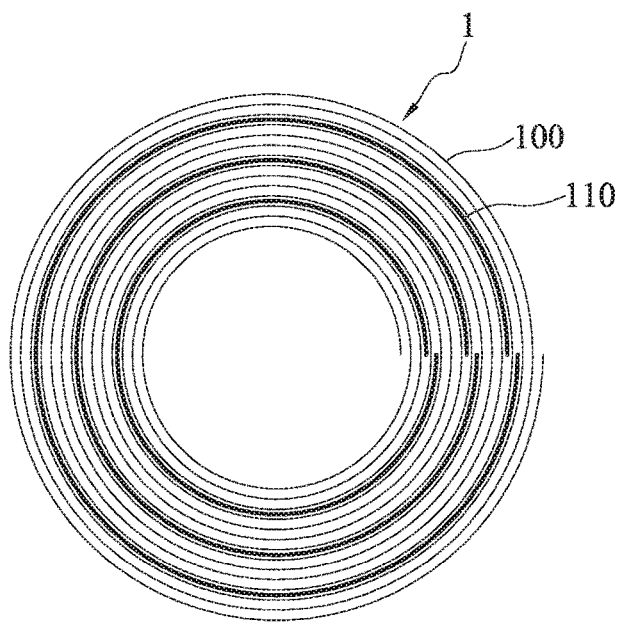
FIG. 2 is a cross-sectional view of a fiber composite material in accordance with the present disclosure.
Figure 3:
FIG. 3 is a side cross-sectional view of a fiber composite material in accordance with the present disclosure.

As shown in FIG. 2, the fiber composite material 1 is in a form of a hollow tube, including: fiber prepreg layer 100 and composite resin layer 110, where the cross-sectional view is shown in FIG. 3. The size of the manufactured fiber composite material is as follows: 450 mm in length; 20 mm in diameter, 4.0 mm in thickness.

Second Embodiment

The manufacturing method and condition of the second embodiment (number: 2 L) of the present disclosure are the same as that in the first embodiment, where the spacing relation between the composite resin layer and the fiber prepreg layer is changed such that the wrapped composite resin layer is located between layer 7 and layer 8 and between layer 13 and layer 14 of the fiber prepreg layers, and the ratio of the layers of the composite resin layer to the layer of the fiber prepreg layers is 1:10.

Third Embodiment

The manufacturing method and condition of the third embodiment (number: 3 L) of the present disclosure are the same as that in the first embodiment, where the spacing relation between the composite resin layer and the fiber prepreg layer is changed such that the wrapped composite resin layer is located between layer 5 and layer 6, between layer 10 and layer 11, and between layer 15 and layer 16 of the fiber prepreg layers, and the ratio of the layers of the composite resin layer to the layers of the fiber prepreg layer is 1:6.7.

Fourth Embodiment

The manufacturing method and condition of the forth embodiment (number: 5 L) of the present disclosure are the same as that in the first embodiment, where the spacing relation between the composite resin layer and the fiber prepreg layer is changed such that the wrapped composite resin layer is located between layer 4 and layer 5, between layer 7 and layer 8, between layer 10 and layer 11, between layer 13 and layer 14, and between layer 16 and 17 of the fiber prepreg layers, and the ratio of the layers of the composite resin layer to the layers of the fiber prepreg layer is 1:4.0.

Fifth Embodiment

The manufacturing method and condition of the fifth embodiment (number: 6 L) of the present disclosure are the same as that in the first embodiment, where the spacing relation between the composite resin layer and the fiber prepreg layer is changed such that the wrapped composite resin layer is located between layer 3 and layer 4, between layer 6 and layer 7, between layer 9 and layer 10, between layer 11 and layer 12, and between layer 14 and layer 15 and between layer 17 and layer 18 of the fiber prepreg layers, and the ratio of the layers of the composite resin layer to the layers of the fiber prepreg layer is 1:3.3.

Comparative Example 1

The manufacturing method and condition of comparative example 1 (number: 0) of the present disclosure are the same as that in the first embodiment, where no composite resin layer is placed on a fiber prepreg layer to obtain a fiber composite material having 20 layers of fiber prepreg layers after wrapping.

Measuring of vibration decay time (s) is carried out using laser displacement meter (Polytec OFV 350 Sensor hand), to measure the time it takes from the start of vibration until vibration is stopped (fix one end of the sample while apply a 2 Kg loading then release the tension to allow vibration). The results are listed in table 1.

According to table 1, comparing with the comparison example 1 without a composite resin layer, the embodiments from 2 L to 6 L having composite resin layer can reach 53.5% to 89.2% full amplitude reduction. Besides, the natural frequency of table 1 refers to the dynamic characteristic existed in an object which is directly proportional to the square root of the rigid strength of the system and inversely proportional to the square root of the mass. As such, as shown in table 1, even though more layers of the composite resin layers produce greater full amplitude reduction, composite resin layers are softer than fiber prepreg layers, such that it is not possible to increase the layers of composite resin layer infinitely. The optimal layer ratio of composite resin layers to fiber prepreg layers is at a range from 1:4 to 1:7. In such range, the vibration damping efficiency and the strength of the fiber composite material increase simultaneously, whereas when the layer ratio between composite resin layers and fiber prepreg layers is 1:3.3 (number: 6 L), even though the vibration damping efficiency continues to increase, the strength of the fiber composite material drops, which not suitable for products that has a high demand for rigid strength.

It will be apparent to those skilled in the art that various modifications and variations can be made to the disclosed methods and materials. It is intended that the specification and examples be considered as exemplary only, with the true scope of the disclosure being indicated by the following claims and their equivalents.

TABLE 1

| No. | Fiber prepreg layer number | Composite resin layer number | Carbon nanotube | Carbon nanotube amount | Locations of composite resin layers | Layer ratio between composite resin layers and fiber prepreg layers | Full amplitude at 0.2 seconds | Full amplitude reduction % in comparison with the comparative example | Natural frequency (Hz) |
|---|---|---|---|---|---|---|---|---|---|
| 0 | 20 | 0 | none | 0 wt % | — | — | 0.575 nm | N/A | 140.0 |
| 2L | 20 | 2 | multi-layered carbon nanotube | 5 wt % | between layer 7 and layer 8; between layer 13 and layer 14 | 1:10.0 | 0.267 nm | 53.50% | 143.0 |
| 3L | 20 | 3 | multi-layered carbon nanotube | 5 wt % | between layer 5 and layer 6; between layer 10 and layer 11; and between layer 15 and layer 16 | 1:6.7 | 0.202 nm | 64.80% | 147.0 |
| 4L | 20 | 4 | multi-layered carbon nantube | 5 wt % | between layer 4 and layer 5; between layer 8 and layer 9; between layer 12 and layer 33; and between layer 16 and layer 17 | 1:5.0 | 0.162 nm | 72.20% | 148.0 |
| 5L | 20 | 5 | multi-layered carbon nantube | 5 wt % | between layer 4 and layer 5; between layer 7 and layer 8; between layer 10 and layer 11; between layer 13 and layer 14; and between layer 16 and layer 17 | 1:4.0 | 0.150 nm | 73.80% | 145.0 |
| 6L | 20 | 6 | multi-layered carbon nantube | 5 wt % | between layer 3 and layer 4; between layer 6 and layer 7; between layer 9 and layer 10; between layer 11 and layer 12; between layer 14 and layer 15; and between layer 17 and layer 18 | 1:3.3 | 0.063 nm | 89.20% | 122.0 |

What is claimed is:
1. A fiber composite material, comprising:
a plurality of fiber prepreg layers each comprising a first resin and fibers impregnated with the first resin; and
at least one composite resin layer disposed between two of the fiber prepreg layers to form a hollow tube with the plurality of fiber prepreg layers, wherein the at least one composite resin layer comprises multi-layered carbon nanotubes and a second resin, and each of the multi-layered carbon nanotubes has reactive functional groups containing an amine group, a carboxyl group, a hydroxyl group or an acyl chloride group on its surface, and wherein the layer ratio of the at least one composite resin layer to the fiber prepreg layers is 1:4 to 1:7.

2. The fiber composite material of claim 1, wherein the first resin and the second resin are identical.

3. The fiber composite material of claim 1, wherein the first resin and the second resin are different.

4. The fiber composite material of claim 1, wherein the first resin is a thermoplastic resin or a thermosetting resin.

5. The fiber composite material of claim 1, wherein the second resin is a thermoplastic resin or a thermosetting resin.

6. The fiber composite material of claim 1, wherein the surface area of the multi-layered carbon nanotube is 100 $m^2/g$ to 300 $m^2/g$.

7. The fiber composite material of claim 1, wherein the amount of the multi-layered carbon nanotubes in the at least one composite resin layer is 0.5 wt % to 8 wt %.

8. The fiber composite material of claim 1, wherein the fibers are carbon fibers, glass fibers, aromatic polyamide fibers, boron fibers, nylon fibers, polyethylene terephthalate fibers, cotton fibers, wool fibers, steel fibers, aluminum fibers or ceramic whisker fibers.

9. A method for manufacturing a fiber composite material, comprising:
   placing at least one composite resin layer on a fiber prepreg layer comprising a first resin and fibers impregnated with the first resin, wherein the at least one composite resin layer comprises multi-layered carbon nanotubes and a second resin and each of the multi-layered carbon nanotubes has reactive functional groups containing an amine group, a carboxyl group, a hydroxyl group or an acyl chloride group;
   wrapping the fiber prepreg layer and the at least one composite resin layer to form a hollow tube, with the layer ratio of the at least one composite resin layer to the fiber prepreg layer between the outer wall and the inner wall of the hollow tube to be 1:4 to 1:7; and
   molding the hollow tube.

10. The method of claim 9, wherein placing at least one composite resin layer comprises placing a plurality of composite resin layers on the fiber prepreg layer.

11. The method of claim 10, wherein the plurality of the composite resin layers are spaced apart.

12. The method of claim 9, wherein the first resin and the second resin are identical.

13. The method of claim 9, wherein the first resin and the second resin are different.

14. The method of claim 9, wherein the first resin is a thermoplastic resin or a thermosetting resin.

15. The method of claim 9, wherein the second resin is a thermoplastic resin or a thermosetting resin.

16. The method of claim 9, wherein the surface area of the multi-layered carbon nanotube is 100 $m^2/g$ to 300 $m^2/g$.

17. The method of claim 9, wherein the amount of the multi-layered carbon nanotubes in the at least one composite resin layer is 0.5 wt % to 8 wt %.

18. The method of claim 9, wherein the fibers are carbon fibers, glass fibers, aromatic polyamide fibers, boron fibers, nylon fibers, polyethylene terephthalate fibers, cotton fibers, wool fibers, steel fibers, aluminum fibers or ceramic whisker fibers.

* * * * *